US012000937B2

(12) United States Patent
Hu et al.

(10) Patent No.: US 12,000,937 B2
(45) Date of Patent: Jun. 4, 2024

(54) CONVENIENT MONITORING METHOD AND SYSTEM FOR SWING COLLAPSE RISK OF SKYSCRAPERS

(71) Applicant: Guangdong University of Petrochemical Technology, Maoming (CN)

(72) Inventors: Shaolin Hu, Maoming (CN); Qinghua Zhang, Maoming (CN); Xinchen Zhu, Maoming (CN); Chenglin Wen, Maoming (CN); Ye Ke, Maoming (CN); Wenqiang Jiang, Maoming (CN); Man Xie, Maoming (CN)

(73) Assignee: GUANGDONG UNIVERSITY OF PETROCHEMICAL TECHNOLOGY, Maoming (CN)

( * ) Notice: Subject to any disclaimer, the term of this patent is extended or adjusted under 35 U.S.C. 154(b) by 392 days.

(21) Appl. No.: 17/581,021

(22) Filed: Jan. 21, 2022

(65) Prior Publication Data

US 2023/0194732 A1    Jun. 22, 2023

(30) Foreign Application Priority Data

Dec. 22, 2021   (CN) .......................... 202111583659.0

(51) Int. Cl.
  *G01S 19/42*   (2010.01)
  *G01S 19/41*   (2010.01)
  *G08B 21/18*   (2006.01)
(52) U.S. Cl.
  CPC ............ *G01S 19/425* (2013.01); *G01S 19/41* (2013.01); *G08B 21/18* (2013.01)

(58) Field of Classification Search
  CPC ......... G01S 19/425; G01S 19/41; G01B 7/16; G06Q 50/08
  See application file for complete search history.

(56) References Cited

U.S. PATENT DOCUMENTS

2020/0363288 A1*  11/2020  Sjoblom ................ G06Q 20/14

FOREIGN PATENT DOCUMENTS

| CN | 102608625 A | * | 7/2012 | ............... G01V 1/18 |
| JP | 2017096867 A | * | 6/2017 | |

* cited by examiner

*Primary Examiner* — Jennifer Bahls
(74) *Attorney, Agent, or Firm* — WPAT, P.C

(57) ABSTRACT

A convenient swing monitoring method and device for skyscrapers is provided. The method firstly designs a building monitoring network based on multi-mode integrated navigation receivers by adopting a vertically distributed three-layer three-dimensional mesh layout, then determines a maximum deviation, maximum inclination angle and maximum inclination azimuth of a building structure, constructs a high-fidelity fault-tolerant filter with anti-outlier effects, draws curves changing with time of structural deformation variables of the building structure, and finally judges whether the building structure has abnormal changes in line with relevant international and domestic building safety standards. The perception and warning of the collapse risk of super-high building structures can be effectively realized, the risk perception ability of skyscraper disasters is improved, and the influence of various factors on the safety of super-high buildings can be accurately monitored, analyzed and evaluated, so as to prevent risks beforehand.

8 Claims, 2 Drawing Sheets

CONVENIENT MONITORING METHOD AND SYSTEM FOR SWING COLLAPSE RISK OF SKYSCRAPERS

TECHNICAL FIELD

The invention relates to the technical field of safety and health monitoring and disaster early warning of urban ultra-high buildings, in particular to a convenient monitoring method and system for swing collapse risk of skyscrapers.

BACKGROUND

Skyscrapers generally refer to all kinds of ultra-high buildings, towers and other buildings, for example, the high-rise buildings everywhere in large and medium-sized cities. Skyscrapers are the product of rapid economic development and the most obvious indicator of urban economic vitality. With the development of economy, a growing number of cities are building super-high-rise buildings for the purpose of demonstrating financial strength or alleviating the space demand of densely-populated cities. In recent years, as for high-rise buildings in developed cities such as Shanghai in China and Shenzhen in China, the average height of new building structures is increasing every year. By the end of 2016, more than 6,000 super high-rise buildings over 100 meters and 485 super high-rise buildings over 200 meters have been built and topped off in large and medium-sized cities in China.

Super-tall buildings keep emerging in various places, the structural safety issues of these buildings have attracted more and more attention from all walks of life, and affected social stability and safety of life and property. For example, on May 18, 2021, Shenzhen SEG Building, the 355.8-meter-high skyscraper in Shenzhen, shook for an unknown reason, and attracted the attention of all walks of life. Internationally, accidents of high-rise buildings tilting or even collapsing have taken place from time to time in recent years. For example, a 10-story residential building in Cairo, Egypt collapsed on Mar. 27, 2021, claiming nearly 20 lives. On June 24th, the collapse of Miami apartment building in the United States caused nearly 100 people to die or disappear. On November 1st, a 21-story building under construction in Lagos, Nigeria collapsed, killing more than 20 people.

The shaking of SEG building, the collapse of Miami apartment building and the collapse of Cairo residential building all reminds us that the urban construction peruses not only height, but more importantly, quality and safety. However, all over the world, the construction of various landmark super-high buildings will not stop in view of the shaking of Shenzhen SEG building in May 2021, nor will people return to the tree nest cave due to the collapse of Miami apartment building. Therefore, it is urgent to improve the risk perception ability in building disasters, and propose more practical methods to monitor, analyze and evaluate the influence of various factors on the safety of super-high buildings, so as to avoid problems in advance. Therefore, the invention proposes a convenient swing monitoring method and device to solve the problems of skyscrapers existing in the prior art.

SUMMARY

In view of the above problems, an objective of the invention is to propose a convenient swing monitoring method and device for skyscrapers. This method can effectively realize the perception and warning of the collapse risk of super-high building structures through networking monitoring of multiple sets of multi-mode integrated navigation receivers and the calculation and feature extraction of building structure features, improve the risk perception ability of skyscraper disasters, and accurately monitor, analyze and evaluate the influence of various factors on the safety of super-high buildings.

In order to achieve the objectives of the invention, the invention is realized by the following technical scheme: a convenient swing monitoring method for skyscrapers, including the following steps:

step 1, establishing a building monitoring network by using a vertically distributed three-layer three-dimensional mesh layout, and setting four monitoring points on each layer of the building monitoring network, each monitoring point is provided with a receiver and a data conversion module (also referred to as data converter), receiving navigation data sent by a satellite navigation system in real time through each receiver, and transmitting monitoring data of the monitoring point to a disaster risk monitoring center through each data conversion module;

step 2, recording differential navigation positioning data obtained by the four monitoring points on each layer of the building monitoring network at $t_k$ moment, which are respectively $\{(x_{i,j}(t_k), y_{i,j}(t_k), z_{i,j}(t_k)|i=1, 2, 3, 4; j=0, 1, 2\}$, where j denotes the layer serial number for three monitoring planes from bottom to top, and i denotes the serial number for the four monitoring points numbered clockwise at the corresponding layer; using differential navigation positioning data of the four monitoring points on the same layer to calculate a central coordinate and a normal vector of the plane in the layer, and respectively determine a maximum deviation, a maximum inclination angle and a maximum inclination azimuth angle of a building structure according to the central coordinates and the normal vectors of the three monitoring planes; and step 3, continuously acquiring sampling data of the building structure by the disaster risk monitoring center based on the building monitoring network, and constructing a high-fidelity fault-tolerant filter with anti-outlier effects to filter the sampling data and extract intrinsic signals, then drawing curves changing with time of the maximum deviation, the maximum inclination angle and the maximum inclination azimuth angle of the building structure according to the extracted intrinsic signals, and then judging whether there is any abnormal change in the building structure according to the relevant international and domestic building safety standards, and giving an alarm and a risk response in case of abnormal circumstances, so as to realize the perception and warning of the collapse risk of the building structure.

A further improvement is that in the step 1, a network layout of the building monitoring network is a bottom-middle-top three-layer structure sequentially distributed from bottom to top, and the receiver is a high-precision multi-mode satellite navigation receiver, and includes different modes of Global Positioning System (GPS)\Global Navigation Satellite System (GNSS)\BeiDou Navigation Satellite System (BD), which are collectively referred to as GNSS, and a converged multi-mode.

A further improvement is that in the step 1, the navigation data includes navigation message and differential positioning data (also referred to as differential navigation positioning data), and the data conversion module transmits the monitoring data of the monitoring point to the disaster risk monitoring center through a ZigBee communication network.

A further improvement is that in the step 2, the center coordinate $(\overline{x}_j, \overline{y}_j, \overline{z}_j)$ is calculated by using the differential navigation positioning coordinates (also referred to as differential navigation positioning data) $\{(x_{i,j}(t_k), y_{i,j}(t_k), z_{i,j}(t_k)|i=1, 2, 3, 4\}$ of the four monitoring points on the j-th (j=0, 1, 2) layer obtained at the $t_k$ moment, and the calculation formula is:

$$\begin{cases} \overline{x}_j(t_k) = \frac{1}{2}\left(\frac{x_{1,j}(t_k)+x_{3,j}(t_k)}{2} + \frac{x_{2,j}(t_k)+x_{4,j}(t_k)}{2}\right) = \frac{1}{4}\sum_{i=1}^{4} x_{i,j}(t_k) \\ \overline{y}_j(t_k) = \frac{1}{2}\left(\frac{y_{1,j}(t_k)+y_{3,j}(t_k)}{2} + \frac{y_{2,j}(t_k)+y_{4,j}(t_k)}{2}\right) = \frac{1}{4}\sum_{i=1}^{4} y_{i,j}(t_k) \\ \overline{z}_j(t_k) = \frac{1}{2}\left(\frac{z_{1,j}(t_k)+z_{3,j}(t_k)}{2} + \frac{z_{2,j}(t_k)+z_{4,j}(t_k)}{2}\right) = \frac{1}{4}\sum_{i=1}^{4} z_{i,j}(t_k) \end{cases}$$

$(j = 0, 1, 2);$ the differential navigation positioning coordinates $\{(x_{i,j}(t_k), y_{i,j}(t_k), z_{i,j}(t_k)|i=1, 2, 3, 4\}$ of the four monitoring points on the j-th (j=0, 1, 2) layer obtained at the $t_k$ moment is used to calculate the normal vector $(l_j, m_j, n_j)$ of the plane j (j=0, 1, 2), and the calculation formula is:

$$\begin{cases} l_j(t_k) = [D_{1,j}(t_k)D_{2,j}(t_k)]^{-1}\begin{vmatrix} y_{1,j}(t_k)-y_{3,j}(t_k) & y_{2,j}(t_k)-y_{4,j}(t_k) \\ z_{1,j}(t_k)-z_{3,j}(t_k) & z_{2,j}(t_k)-z_{4,j}(t_k) \end{vmatrix} \\ m_j(t_k) = [D_{1,j}(t_k)D_{2,j}(t_k)]^{-1}\begin{vmatrix} z_{1,j}(t_k)-z_{3,j}(t_k) & z_{2,j}(t_k)-z_{4,j}(t_k) \\ x_{1,j}(t_k)-x_{3,j}(t_k) & x_{2,j}(t_k)-x_{4,j}(t_k) \end{vmatrix} \\ n_j(t_k) = [D_{1,j}(t_k)D_{2,j}(t_k)]^{-1}\begin{vmatrix} x_{1,j}(t_k)-x_{3,j}(t_k) & x_{2,j}(t_k)-x_{4,j}(t_k) \\ y_{1,j}(t_k)-y_{3,j}(t_k) & y_{2,j}(t_k)-y_{4,j}(t_k) \end{vmatrix} \end{cases}$$

$(j = 0, 1, 2),$ where $$\begin{cases} D_{1,j}(t_k) = \sqrt{\begin{aligned}(x_{1,j}(t_k)-x_{3,j}(t_k))^2 + \\ (y_{1,j}(t_k)-y_{3,j}(t_k))^2 + \\ (z_{1,j}(t_k)-z_{3,j}(t_k))^2\end{aligned}} \\ D_{2,j}(t_k) = \sqrt{\begin{aligned}(x_{2,j}(t_k)-x_{4,j}(t_k))^2 + \\ (y_{2,j}(t_k)-y_{4,j}(t_k))^2 + \\ (z_{2j}(t_k)-z_{4,j}(t_k))^2\end{aligned}} \end{cases}$$

A further improvement is that the maximum deviation of the building structure is calculated by using the center coordinate $(\overline{x}_j, \overline{y}_j, \overline{z}_j)$ (j=0, 1, 2) of three different layers obtained by calculation, and the calculation formula is:

$$D_{0,2}(t_k) = \sqrt{(\overline{x}_2(t_k)-\overline{x}_0(t_k))^2+(\overline{y}_2(t_k)-\overline{y}_0(t_k))^2};$$

the normal vectors $(l_j, m_j, n_j)$ of three different planes j (j=0, 1, 2) are used to calculate the maximum inclination angle of the building structure. The calculation formula is:

$$\theta(t_k) = \max_{j=0,1,2} \arccos\{n_j(t_k)\};$$

the maximum inclination azimuth of the building structure is calculated and the formula is:

$$\phi(t_k) = \max_{j=0,1,2} \arccos\{l_j(t_k)\}.$$

A further improvement is that in the step 3, the specific algorithm of constructing the high-fidelity fault-tolerant filter with anti-outlier effects is as follows:
S1, selecting an odd number r, setting the width of the sliding window to be L=3r, as for the deformation degree sequence $\{\xi_k(t_k)\} \in \{\{D_{0,2}(t_k)\}, \{\theta(t_k)\}, \{\phi(t_k)\}\}$ of the building structure, recording $\{L_\xi(t_{k-s}), \ldots, L_\xi(t_{k+s})\}$ as the sequence of data segments $\{\xi(t_{k-s}), \ldots, \xi(t_{k+s})\}$ sorted from small to large, and performing the sliding tertile fault-tolerant mean filtering, the filtering calculation formula is:

$$F_\xi(t_k) = \frac{1}{r}\sum_{j=-s+r}^{s-r} L_\xi(t_{k+j}) (k = s+1, s+2, \ldots, n-s),$$

where s=(3r−1)/2, and n is the number of sampling data points;
S2, comparing the original sequence $\{\xi_k(t_k)\} \in \{\{D_{0,2}(t_k)\}, \{\theta(t_k)\}, \{\theta(t_k)\}, \{\phi(t_k)\}\}$ with the tertile fault-tolerant mean filtering to make a difference to form a residual sequence $\Delta_\xi(t_k) = \xi(t_k) - F_\xi(t_k)$;
S3, adding s number of zeros to the left and right ends of the residual sequence $\{\Delta_\xi(t_k)\}$ to form a residual sequence with the number still being $n$ , and performing sliding tertile fault-tolerant mean filtering again to obtain residual tertile fault-tolerant filtering:

$$F_{\Delta\xi}(t_k) = \frac{1}{r}\sum_{j=-s+r}^{s-r} L_{\Delta\xi}(t_{k+j}) (k = s+1, s+2, \ldots, n-s),$$

where $\{L_{\Delta\xi}(t_{k-s}), \ldots, L_{\Delta\xi}(t_{k+s})\}$ is the data sequence of residual fragments $\{\Delta_\xi(t_{k-s}), \ldots, \Delta_\xi(t_{k+s})\}$ sorted from small to large;
S4, compensating the residual error of the tertile fault-tolerant mean filtering $F_\xi(t_k)$ obtained in the S1 by using the residual tertile fault-tolerant filtering $F_{\Delta\xi}(t_k)$ obtained in the S3 to obtain the digital sequence double tertile sliding filtering $\{\xi_k(t_k)\} \in \{\{D_{0,2}(t_k)\}, \{\theta(t_k)\}, \{\phi(t_k)\}\}$, the calculation formula is: $\xi(t_k) = F_\xi(t_k) + F_{\Delta\xi}(t_k)$ (k=s+1, s+2, \ldots, n−s) which is the high-fidelity fault-tolerant filter.

The convenient swing monitoring device for skyscrapers includes a distributed building monitoring network and a centralized disaster risk monitoring center; the distributed building monitoring network has a three-layer three-dimensional mesh layout which is vertically distributed, and each layer of the distributed building monitoring network is provided with four monitoring points, each monitoring point is provided with a receiver and a data conversion module, and is responsible for receiving and forwarding satellite navigation messages and navigation positioning measured data; the disaster risk monitoring center includes a data receiving module, a center point coordinate and normal vector calculating module, a structural deformation variables calculating module, a structural deformation variables sliding filtering and feature extraction module, a risk judging module and an early warning module which are sequentially connected, and the data receiving module is connected with the building monitoring network.

the data receiving module, the center point coordinate and normal vector calculating module, the structural deformation variables calculating module, the structural deformation variables sliding filtering and feature extraction module, the risk judging module and the early warning module are software modules stored in one or more memories and executable by one or more processors coupled to the one or more memories.

A further improvement is that the data receiving module receives data from the distributed building monitoring network, the center point coordinate and normal vector calculating module calculate the center point coordinates and normal vectors from the distributed building monitoring network, the structural deformation variables calculating module calculates the maximum deviation, the maximum inclination angle and the maximum inclination azimuth angle of the building structure, the structural deformation variables sliding filtering and feature extraction module constructs the high-fidelity fault-tolerant filter and draws the curves of the maximum deviation, the maximum inclination angle and the maximum inclination azimuth of the building structure changing with time, the risk judging module determines whether the maximum deviation, the maximum inclination angle and the maximum inclination azimuth of the building structure have abnormal changes, and the early warning module performs abnormal alarm and risk response when the risk judging module judges that the building has abnormal changes.

The invention has the beneficial effects that the differential navigation positioning data of buildings are collected by designing the building monitoring network, and structural deformation variables including the maximum deviation, the maximum inclination angle and the maximum inclination azimuth are calculated out, so as to facilitate the risk judgment of skyscrapers and the constructed high-fidelity fault-tolerant filter can filter data of monitoring devices such as receivers and so on, so that the data is more accurate. Moreover, through the networking monitoring of multiple sets of multi-mode integrated navigation receivers, the calculation and feature extraction of building structure features, the perception and warning of the collapse risk of super-high building structures can be effectively realized, the risk perception ability of skyscraper disasters can be improved, and the influence of various factors on the safety of super-high buildings can be accurately monitored, analyzed and evaluated, so as to avoid problems beforehand.

BRIEF DESCRIPTION OF THE DRAWINGS

In order to more clearly explain the embodiments of the invention or the technical solutions in the prior art, the following will briefly introduce the drawings that need to be used in the description of the embodiments or the prior art. Obviously, the drawings in the following description are only some embodiments of the invention, and for ordinary technicians in the field, other drawings can be obtained according to these drawings without making any creative efforts.

DETAILED DESCRIPTION OF THE EMBODIMENTS

Next, the technical solutions in the embodiments of the invention will be clearly and completely described with reference to the drawings in the embodiments of the invention. Obviously, the described embodiments are only part of the embodiments of the invention, not all of them. Based on the embodiments in the invention, all other embodiments obtained by ordinary technicians in the field without creative work are within the protection scope of the invention.

Embodiment 1

Figure 1:
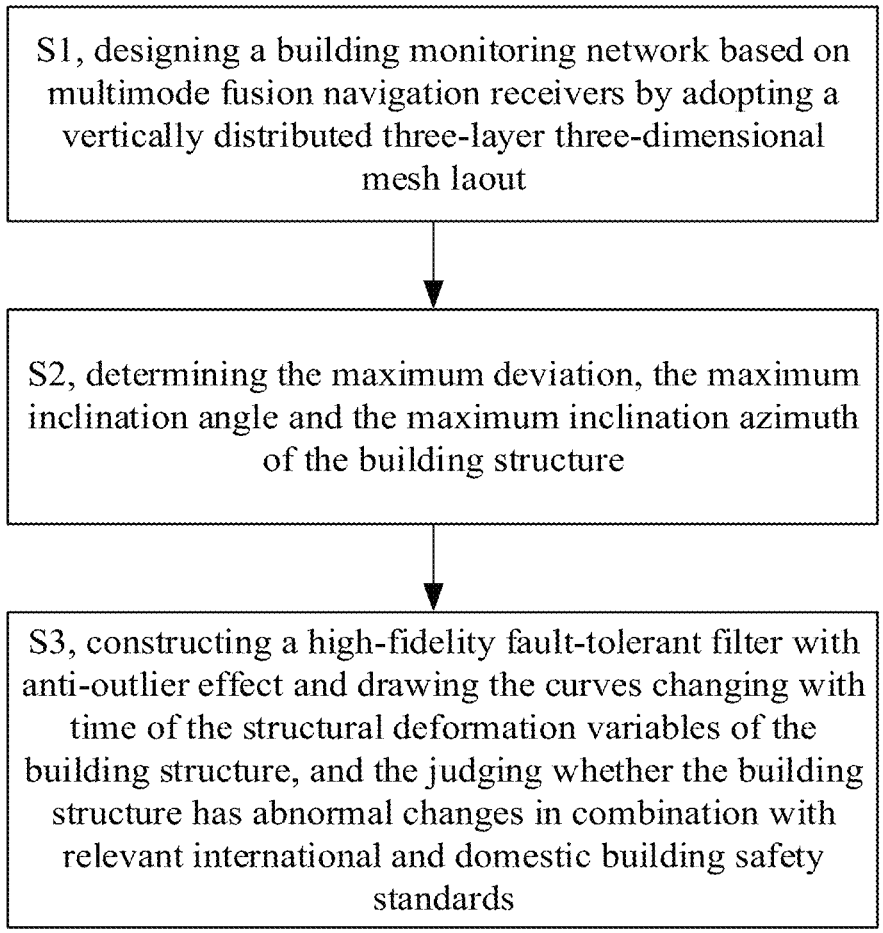
FIG. 1 is a flowchart of the method of the embodiment 1 of the invention.
Figure 2:
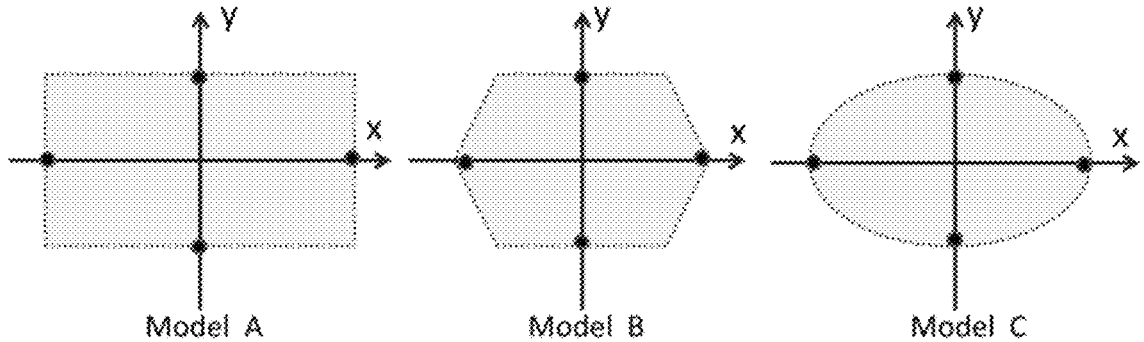
FIG. 2 is a schematic diagram of the layout of four monitoring points on different shapes of horizontal sections in the embodiment 1 of the invention.

Referring to FIG. 1 and FIG. 2, this embodiment provides the convenient swing monitoring method for skyscrapers, which includes the following steps:

step 1, establishing a building monitoring network by using a vertically distributed three-layer three-dimensional mesh layout, and setting four monitoring points on each layer of the monitoring network, each monitoring point is provided with the receiver and the data conversion module, receiving navigation data sent by the satellite navigation system in real time through each receiver, and transmitting monitoring data of the monitoring point to a disaster risk monitoring center through each data conversion module; a network layout of the building monitoring network is a bottom-middle-top three-layer structure sequentially distributed from bottom to top, and the receiver is a high-precision multi-mode satellite navigation receiver, and includes different modes of GPS\GNSS\BD and a converged multi-mode; the navigation data includes navigation message and differential positioning data, and the data conversion module transmits the monitoring data of the corresponding monitoring point to the disaster risk monitoring center through ZigBee communication network;

step 2, recording the differential navigation positioning data obtained by the four monitoring points on each layer of the building monitoring network at the $t_k$ moment, which are respectively $\{(x_{i,j}(t_k), y_{i,j}(t_k), z_{i,j}(t_k)|i=1, 2, 3, 4; j=0, 1, 2\}$, where j represents the layer serial number for three monitoring planes from bottom to top, and i represents the serial number for the four monitoring points numbered clockwise at a j-th layer of the building monitoring network; using differential navigation positioning data of the four monitoring points in the same layer to respectively calculate a central coordinate and a normal vector of the plane in the layer, and respectively determine a maximum deviation, a maximum inclination angle and a maximum inclination azimuth angle of a building structure according to the calculated central coordinates and normal vectors of the three monitoring planes;

the center coordinate $(\bar{x}_j, \bar{y}_j, \bar{z}_j)$ is calculated by using the differential navigation positioning coordinates $\{(x_{i,j}(t_k), y_{i,j}(t_k), z_{i,j}(t_k)|i=1, 2, 3, 4\}$ of the four monitoring points on the j-th (j=0, 1, 2) layer obtained at the $t_k$ moment, and the calculation formula is:

$$\begin{cases} \bar{x}_j(t_k) = \frac{1}{2}\left(\frac{x_{1,j}(t_k)+x_{3,j}(t_k)}{2} + \frac{x_{2,j}(t_k)+x_{4,j}(t_k)}{2}\right) = \frac{1}{4}\sum_{i=1}^{4} x_{i,j}(t_k) \\ \bar{y}_j(t_k) = \frac{1}{2}\left(\frac{y_{1,j}(t_k)+y_{3,j}(t_k)}{2} + \frac{y_{2,j}(t_k)+y_{4,j}(t_k)}{2}\right) = \frac{1}{4}\sum_{i=1}^{4} y_{i,j}(t_k) \\ \bar{z}_j(t_k) = \frac{1}{2}\left(\frac{z_{1,j}(t_k)+z_{3,j}(t_k)}{2} + \frac{z_{2,j}(t_k)+z_{4,j}(t_k)}{2}\right) = \frac{1}{4}\sum_{i=1}^{4} z_{i,j}(t_k) \end{cases}$$

(j = 0, 1, 2);

the differential navigation positioning coordinates $\{(x_{i,j}(t_k), y_{i,j}(t_k), z_{i,j}(t_k) | i=1, 2, 3, 4\}$ of the four monitoring points on the j-th (j=0, 1, 2) layer obtained at the $t_k$ moment is used to calculate the normal vector $(l_j, m_j, n_j)$ of the plane j (j=0, 1, 2), and the calculation formula is:

$$\begin{cases} l_j(t_k) = [D_{1,j}(t_k)D_{2,j}(t_k)]^{-1} \begin{vmatrix} y_{1,j}(t_k) - y_{3,j}(t_k) & y_{2,j}(t_k) - y_{4,j}(t_k) \\ z_{1,j}(t_k) - z_{3,j}(t_k) & z_{2,j}(t_k) - z_{4,j}(t_k) \end{vmatrix} \\ m_j(t_k) = [D_{1,j}(t_k)D_{2,j}(t_k)]^{-1} \begin{vmatrix} z_{1,j}(t_k) - z_{3,j}(t_k) & z_{2,j}(t_k) - z_{4,j}(t_k) \\ x_{1,j}(t_k) - x_{3,j}(t_k) & x_{2,j}(t_k) - x_{4,j}(t_k) \end{vmatrix} \\ n_j(t_k) = [D_{1,j}(t_k)D_{2,j}(t_k)]^{-1} \begin{vmatrix} x_{1,j}(t_k) - x_{3,j}(t_k) & x_{2,j}(t_k) - x_{4,j}(t_k) \\ y_{1,j}(t_k) - y_{3,j}(t_k) & y_{2,j}(t_k) - y_{4,j}(t_k) \end{vmatrix} \end{cases}$$

$(j = 0, 1, 2),$ where $$\begin{cases} D_{1,j}(t_k) = \sqrt{\begin{array}{l}(x_{1,j}(t_k) - (x_{3,j}(t_k))^2 + \\ (y_{1,j}(t_k) - y_{3,j}(t_k))^2 + \\ (z_{1,j}(t_k) - z_{3,j}(t_k))^2\end{array}} \\ D_{2,j}(t_k) = \sqrt{\begin{array}{l}(x_{2,j}(t_k) - (x_{4,j}(t_k))^2 + \\ (y_{2,j}(t_k) - y_{4,j}(t_k))^2 + \\ (z_{2,j}(t_k) - z_{4,j}(t_k))^2\end{array}} \end{cases};$$

the maximum deviation of the building structure is calculated by using the center coordinates $(\bar{x}_j, \bar{y}_j, \bar{z}_j)(j=0, 1, 2)$ of three different layers obtained by calculation, and the calculation formula is:

$$D_{0,2}(t_k) = \sqrt{(\bar{x}_2(t_k) - \bar{x}_0(t_k))^2 + (\bar{y}_2(t_k) - \bar{y}_0(t_k))^2};$$

the normal vectors $(l_j, m_j, n_j)$ of three different planes j (j=0, 1, 2) is used to calculate the maximum inclination angle of the building structure. The calculation formula is:

$$\theta(t_k) = \max_{j=0,1,2} \arccos\{n_j(t_k)\};$$

then the maximum inclination azimuth of the building structure is calculated and the formula is:

$$\phi(t_k) = \max_{j=0,1,2} \arccos\{l_j(t_k)\};$$

and step 3, continuously acquiring sampling data of the building structure by the disaster risk monitoring center based on the building monitoring network, and constructing a high-fidelity fault-tolerant filter with anti-outlier effects to filter the sampling data and extract intrinsic signals, then drawing curves changing with time of the maximum deviation, the maximum inclination angle and the maximum inclination azimuth angle of the building structure according to the extracted intrinsic signals, and then judging whether there is any abnormal change in the building structure according to the relevant international and domestic building safety standards, and giving an alarm and a risk response in case of abnormal circumstances, so as to realize the perception and warning of the collapse risk of the building structure;

the specific algorithm of constructing the high-fidelity fault-tolerant filter with anti-outlier effect is as follows:

S1, selecting an odd number r, setting the width of the sliding window to be L=3r, as for the deformation degree sequence $\{\xi_k(t_k)\} \in \{\{D_{0,2}(t_k)\}, \{\theta(t_k)\}, \{\phi(t_k)\}\}$ of the structure, recording $\{L_\xi(t_{k-s}), \ldots, L_\xi(t_{k+s})\}$ as the sequence of data segments $\{L_\xi(t_{k-s}), \ldots, L_\xi(t_{k+s})\}$ sorted from small to large, and performing the sliding tertile fault-tolerant mean filtering, the filtering calculation formula is:

$$F_\xi(t_k) = \frac{1}{r}\sum_{j=-s+r}^{s-r} L_\xi(t_{k+j})(k = s+1, s+2, \ldots, n-s),$$

where s=(3r−1)/2, and n is the number of sampling data points;

S2, comparing the original sequence (also referred to as deformation degree sequence) $\{\xi_k(t_k)\} \in \{\{D_{0,2}(t_k)\}, \{\theta(t_k)\}, \{\phi(t_k)\}\}$ with the tertile fault-tolerant mean filtering to make a difference to form the residual sequence $\Delta_\xi(t_k) = \xi(t_k) - F_\xi(t_k)$;

S3, adding s number of zeros to the left and right ends of the residual sequence $\{\Delta_\xi(t_k)\}$ to form a residual sequence with the number still being $n$, and performing sliding tertile fault-tolerant mean filtering again to obtain residual tertile fault-tolerant filtering:

$$F_{\Delta\xi}(t_k) = \frac{1}{r}\sum_{j=-s+r}^{s-r} L_{\Delta\xi}(t_{k+j})(k = s+1, s+2, \ldots, n-s),$$

where $\{L_{\Delta\xi}(t_{k-s}), \ldots, L_{\Delta\xi}(t_{k+s})\}$ is the data sequence of residual fragments $\{\Delta_\xi(t_{k-s}), \ldots, \Delta_\xi(t_{k+s})\}$ sorted from small to large;

S4, compensating the residual error of the tertile fault-tolerant mean filtering $F_\xi(t_k)$ obtained in the S1 by using the residual tertile fault-tolerant filtering $F_{\Delta\xi}(t_k)$ obtained in the S3 to obtain the digital sequence double tertile sliding filtering $\{\xi_k(t_k)\} \in \{\{D_{0,2}(t_k)\}, \{\theta(t_k)\}, \{\phi(t_k)\}\}$, the calculation formula is: $\xi(t_k) = F_\xi(t_k) + F_{\Delta\xi}(t_k)$ (k=s+1, s+2, . . . , n-s);

as long as the number of abnormal data of outlier spots in the sliding window does not reach ⅓ of the number of data points in the sliding window, the filtering result will not be distorted due to the influence of abnormal data, so the filtering algorithm of the invention has good fault-tolerant fidelity, that is, a high-fidelity fault-tolerant filter.

Embodiment 2

Figure 3:
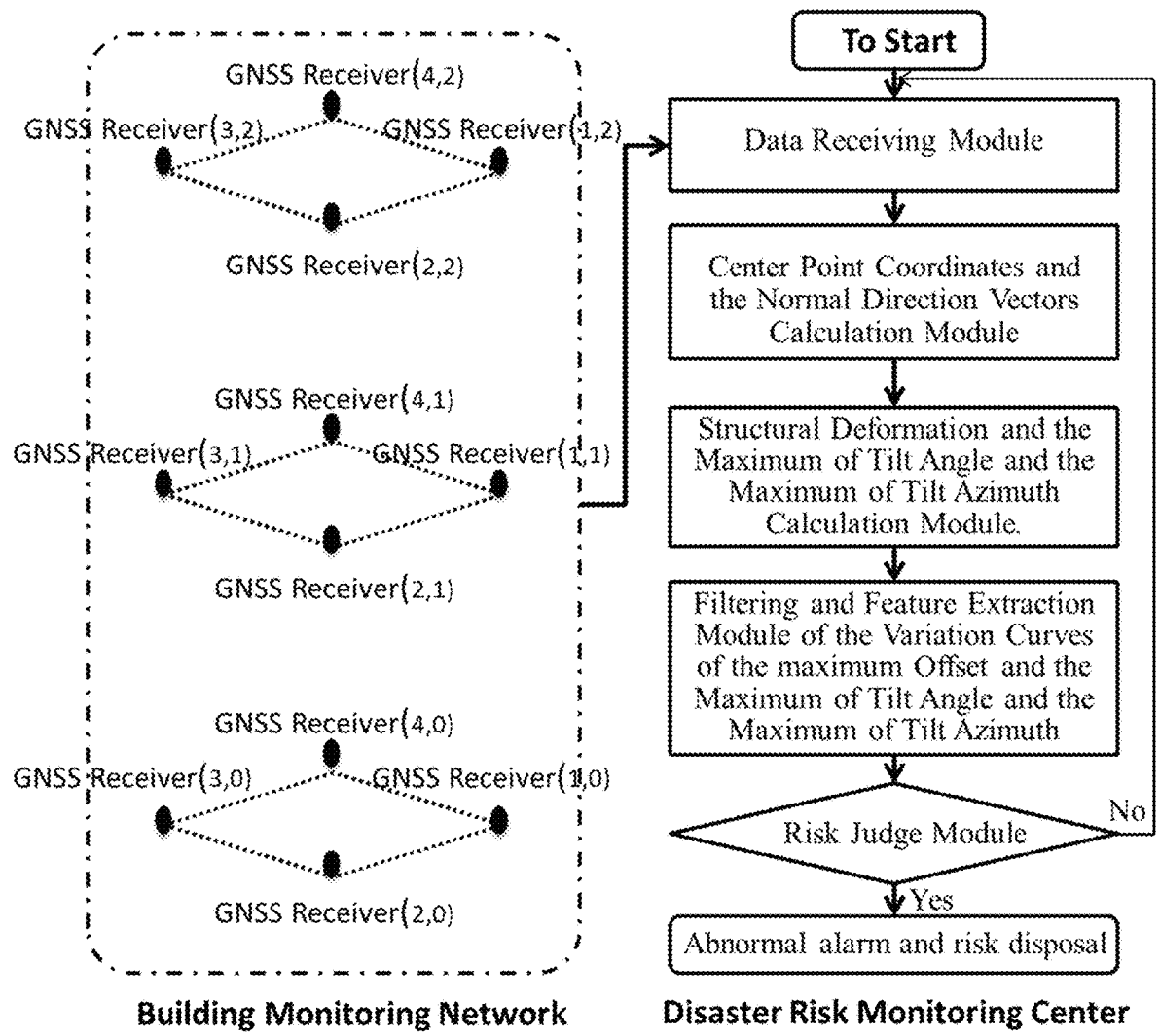
FIG. 3 is a schematic diagram of the structure of the device according to the embodiment 2 of the invention.

With reference to FIG. 3, this embodiment provides the convenient swing monitoring device for skyscrapers which includes the distributed building monitoring network and the centralized disaster risk monitoring center; the distributed building monitoring network has a three-layer three-dimensional mesh layout which is vertically distributed, and each layer of the distributed building monitoring network is provided with four monitoring points, each monitoring point is provided with a receiver and a data conversion module, and is responsible for receiving and forwarding satellite navigation messages and navigation positioning measured data; the disaster risk monitoring center includes the data receiving module, the center point coordinate and normal vector calculating module, the structural deformation variables calculating module, the structural deformation variables sliding filtering and feature extraction module, the risk judging module and the early warning module which are sequentially connected and the data receiving module is connected with the building monitoring network.

The data receiving module receives data from the distributed building monitoring network, the center point coordinate and normal vector calculating module calculates the center point coordinates and normal vectors from the distributed building monitoring network, the structural deformation variables calculating module calculates the maximum deviation, the maximum inclination angle and the maximum inclination azimuth angle of the building structure, the structural deformation variables sliding filtering and feature extraction module constructs the high-fidelity fault-tolerant filter and draws the curves of the maximum deviation, the maximum inclination angle and the maximum inclination azimuth of the building structure changing with time, the risk judging module determines whether the maximum deviation, the maximum inclination angle and the maximum inclination azimuth of the building structure have abnormal changes, and the early warning module performs abnormal alarm and risk response when the risk judging module judges that the building has abnormal changes.

It is worth mentioning that, in some embodiments, the data conversion module (also referred to as data converter) is embodied by at least one processor and at least one memory coupled to the at least one processor, and the at least one memory stores programs executable by the at least one processor. Likewise, the data receiving module, the center point coordinate and normal vector calculating module, the structural deformation variables calculating module, the structural deformation variables sliding filtering and feature extraction module, the risk judging module and the early warning module are embodied by at least one processor and at least one memory coupled to the at least one processor, and the at least one memory stores programs executable by the at least one processor.

The above description is only the preferred embodiment of the present invention, and it is not intended to limit the present invention. Any modification, equivalent replacement, improvement, etc. made within the spirit and principle of the present invention should be included in the scope of protection of the present invention.

What is claimed is:

1. A swing monitoring method for skyscrapers, comprising:
    step 1, establishing a building monitoring network by using a vertically distributed three-layer three-dimensional mesh layout, and setting four monitoring points on each layer of the building monitoring network, wherein each of the four monitoring points is provided with a receiver and a data converter, the receiver is configured to receive navigation data sent by a satellite navigation system in real time, and the data converter is configured to transmit monitoring data of corresponding one of the four monitoring points to a disaster risk monitoring center;
    step 2, recording differential navigation positioning data obtained by the four monitoring points on each layer of the building monitoring network at $t_k$ moment, using differential navigation positioning data of the four monitoring points on a same layer of the building monitoring network to calculate a central coordinate and a normal vector of a monitoring plane corresponding to the same layer to thereby obtain calculated central coordinates and calculated normal vectors for three layers of the building monitoring network, and determining a maximum deviation, a maximum inclination angle and a maximum inclination azimuth angle of a building structure according to the calculated central coordinates and the calculated normal vectors; wherein the differential navigation positioning data by the four monitoring points on each layer of the building monitoring network at $t_k$ moment respectively are $\{(x_{i,j}(t_k), y_{i,j}(t_k), z_{i,j}(t_k)|i=1, 2, 3, 4; j=0, 1, 2\}$, where j represents a layer serial number for three monitoring planes of the building monitoring network from bottom to top, and i represents a serial number for the four monitoring points numbered clockwise at a j-th layer of the building monitoring network; and
    step 3, continuously acquiring sampling data of the building structure by the disaster risk monitoring center based on the building monitoring network, and constructing a high-fidelity fault-tolerant filter with anti-outlier effects to filter the sampling data and extract intrinsic signals, then drawing curves changing with time of the maximum deviation, the maximum inclination angle and the maximum inclination azimuth angle of the building structure according to the extracted intrinsic signals, and then judging whether there is any abnormal change in the building structure according to relevant international and domestic building safety standards, and giving an alarm and a risk response in case of abnormal circumstances, so as to realize perception and warning of a collapse risk of the building structure.

2. The swing monitoring method according to claim 1, wherein in the step 1, a network layout of the building monitoring network is a bottom-middle-top three-layer structure sequentially distributed from bottom to top, and the receiver is a multi-mode satellite navigation receiver, and comprises different modes of Global Positioning System (GPS)\Global Navigation Satellite System (GNSS)\BeiDou Navigation Satellite System (BD) and a converged multi-mode.

3. The swing monitoring method according to claim 1, wherein in the step 1, the navigation data comprises navigation message and differential positioning data, and the data converter transmits the monitoring data of the corresponding one of the four monitoring points to the disaster risk monitoring center through a ZigBee communication network.

4. The swing monitoring method according to claim 1, wherein in the step 2, using the differential navigation positioning data $\{(x_{i,j}(t_k), y_{i,j}(t_k), z_{i,j}(t_k)|i=1, 2, 3, 4\}$ of the four monitoring points on the j-th layer obtained at the $t_k$ moment to calculate the center coordinate $(\bar{x}_j, \bar{y}_j, \bar{z}_j)$ of the j-th layer according to the following calculation formula:

$$\begin{cases} \bar{x}_j(t_k) = \frac{1}{2}\left(\frac{x_{1,j}(t_k) + x_{3,j}(t_k)}{2} + \frac{x_{2,j}(t_k) + x_{4,j}(t_k)}{2}\right) = \frac{1}{4}\sum_{i=1}^{4} x_{i,j}(t_k) \\ \bar{y}_j(t_k) = \frac{1}{2}\left(\frac{y_{1,j}(t_k) + y_{3,j}(t_k)}{2} + \frac{y_{2,j}(t_k) + y_{4,j}(t_k)}{2}\right) = \frac{1}{4}\sum_{i=1}^{4} y_{i,j}(t_k), \\ \bar{z}_j(t_k) = \frac{1}{2}\left(\frac{z_{1,j}(t_k) + z_{3,j}(t_k)}{2} + \frac{z_{2,j}(t_k) + z_{4,j}(t_k)}{2}\right) = \frac{1}{4}\sum_{i=1}^{4} z_{i,j}(t_k) \end{cases}$$

where $j = 0, 1, 2;$ wherein using the differential navigation positioning data $\{(x_{i,j}(t_k), y_{i,j}(t_k), z_{i,j}(t_k)|i=1, 2, 3, 4\}$ of the four monitoring points on the j-th layer obtained at the $t_k$ moment to calculate the normal vector $(l_j, m_j, n_j)$ of the monitoring plane j (j=0, 1, 2) corresponding to the j-th layer according to the following calculation formula:

$$\begin{cases} l_j(t_k) = [D_{1,j}(t_k)D_{2,j}(t_k)]^{-1} \begin{vmatrix} y_{1,j}(t_k) - y_{3,j}(t_k) & y_{2,j}(t_k) - y_{4,j}(t_k) \\ z_{1,j}(t_k) - z_{3,j}(t_k) & z_{2,j}(t_k) - z_{4,j}(t_k) \end{vmatrix} \\ m_j(t_k) = [D_{1,j}(t_k)D_{2,j}(t_k)]^{-1} \begin{vmatrix} z_{1,j}(t_k) - z_{3,j}(t_k) & z_{2,j}(t_k) - z_{4,j}(t_k) \\ x_{1,j}(t_k) - x_{3,j}(t_k) & x_{2,j}(t_k) - x_{4,j}(t_k) \end{vmatrix}, \\ n_j(t_k) = [D_{1,j}(t_k)D_{2,j}(t_k)]^{-1} \begin{vmatrix} x_{1,j}(t_k) - x_{3,j}(t_k) & x_{2,j}(t_k) - x_{4,j}(t_k) \\ y_{1,j}(t_k) - y_{3,j}(t_k) & y_{2,j}(t_k) - y_{4,j}(t_k) \end{vmatrix} \end{cases}$$

where j=0, 1, 2, and $$\begin{cases} D_{1,j}(t_k) = \sqrt{\begin{array}{l}(x_{1,j}(t_k) - (x_{3,j}(t_k))^2 + \\ (y_{1,j}(t_k) - y_{3,j}(t_k))^2 + \\ (z_{1,j}(t_k) - z_{3,j}(t_k))^2\end{array}} \\ D_{2,j}(t_k) = \sqrt{\begin{array}{l}(x_{2,j}(t_k) - (x_{4,j}(t_k))^2 + \\ (y_{2,j}(t_k) - y_{4,j}(t_k))^2 + \\ (z_{2,j}(t_k) - z_{4,j}(t_k))^2\end{array}} \end{cases}.$$

5. The swing monitoring method according to claim 4, wherein the maximum deviation of the building structure is calculated out by using three calculated central coordinates ($\bar{x}_j$, $\bar{y}_j$, $\bar{z}_j$) of three monitoring planes according to a calculation formula that:

$D_{0,2}(t_k) = \sqrt{(\bar{x}_2(t_k) - \bar{x}_0(t_k))^2 + (\bar{y}_2(t_k) - \bar{y}_0(t_k))^2}$, where j=0, 1, 2 respectively;

wherein the maximum inclination angle of the building structure is calculated out by using three calculated normal vectors ($l_j$, $m_j$, $n_j$) of the three monitoring planes j (j=0, 1, 2) according to a calculation formula that:

$$\theta(t_k) = \max_{j=0,1,2} \arccos\{n_j(t_k)\};$$

wherein the maximum inclination azimuth of the building structure is calculated out according to a calculation formula that:

$$\phi(t_k) = \max_{j=0,1,2} \arccos\{l_j(t_k)\}.$$

6. The swing monitoring method according to claim 1, wherein in the step 3, a specific algorithm of the constructing the high-fidelity fault-tolerant filter with anti-outlier effects is as follows:
S1, selecting an odd number r, setting a width of a sliding window to be L=3 r, as for a deformation degree sequence $\{\xi_k(t_k)\} \in \{\{D_{0,2}(t_k)\}, \{\theta(t_k)\}, \{\phi(t_k)\}\}$ of the building structure, recording $\{L_\xi(t_{k-s}), \ldots, L_\xi(t_{k+s})\}$ as a sequence of a data segment $\{\xi(t_{k-s}), \ldots, (t_{k+s})\}$ sorted from small to large, and performing sliding tertile fault-tolerant mean filtering according to follow calculation formula to obtain a tertile fault-tolerant mean filtering:

$$F_\xi(t_k) = \frac{1}{r}\sum_{j=-s+r}^{s-r} L_\xi(t_{k+j})(k = s+1, s+2, \ldots, n-s),$$

where s=(3r−1)/2, and n is a number of sampling data points;
S2, comparing the deformation degree sequence $\{\xi_k(t_k)\} \in \{\{D_{0,2}(t_k)\}, \{\theta(t_k)\}, \{\phi(t_k)\}\}$ with the tertile fault-tolerant mean filtering to form a residual sequence $\Delta_\xi(t_k) = \xi(t_k) - F_\xi(t_k)$;

S3, adding s number of zeros to left and right ends of the residual sequence $\{\Delta_\xi(t_k)\}$ to form another residual sequence with a number still being n, and performing the sliding tertile fault-tolerant mean filtering again to obtain a residual tertile fault-tolerant filtering:

$$F_{\Delta\xi}(t_k) = \frac{1}{r}\sum_{j=-s+r}^{s-r} L_{\Delta\xi}(t_{k+j})(k = s+1, s+2, \ldots, n-s),$$

where $\{L_{\Delta\xi}(t_{k-s}), \ldots, L_{\Delta\xi}(t_{k+s})\}$ is a data sequence of a residual fragment $\{\Delta_\xi(t_{k-s}), \ldots, \Delta_\xi(t_{k+s})\}$ sorted from small to large;
S4, compensating residual errors of the tertile fault-tolerant mean filtering $F_\xi(t_k)$ obtained in the S1 by using the residual tertile fault-tolerant filtering $F_{\Delta\xi}(t_k)$ obtained in the S3 to obtain a digital sequence double tertile sliding filtering of the deformation degree sequence $\{\bar{\xi}_k(t_k)\} \in \{\{D_{0,2}(t_k)\}, \{\theta(t_k)\}, \{\phi(t_k)\}\}$ according to follow calculation formula:
$\bar{\xi}(t_k) = F_\xi(t_k) + F_{\Delta\xi}(t_k)$ (k=s+1, s+2, . . . , n−s), which is the high-fidelity fault-tolerant filter.

7. A swing monitoring device for skyscrapers, comprising a distributed building monitoring network and a centralized disaster risk monitoring center;
wherein the distributed building monitoring network has a vertically distributed three-layer three-dimensional mesh layout, and each layer of the distributed building monitoring network is provided with four monitoring points, each of the four monitoring point is provided with a receiver and a data converter and responsible for receiving and forwarding satellite navigation messages and navigation positioning measured data; and
wherein the centralized disaster risk monitoring center comprises a data receiving module, a center point coordinate and normal vector calculating module, a structural deformation variables calculating module, a structural deformation variables sliding filtering and feature extraction module, a risk judging module and an early warning module sequentially connected one by one and the data receiving module is connected with the distributed building monitoring network;
wherein the data receiving module, the center point coordinate and normal vector calculating module, the structural deformation variables calculating module, the structural deformation variables sliding filtering and feature extraction module, the risk judging module and the early warning module are software modules stored in one or more memories and executable by one or more processors coupled to the one or more memories.

8. The swing monitoring device according to claim 7, wherein the data receiving module is configured to receive data from the distributed building monitoring network, the center point coordinate and normal vector calculating module is configured to calculate center point coordinates and normal vectors from the distributed building monitoring network, the structural deformation variables calculating module is configured to calculate a maximum deviation, a maximum inclination angle and a maximum inclination azimuth angle of a building structure, the structural deformation variables sliding filtering and feature extraction module is configured to construct a high-fidelity fault-tolerant filter and draw curves of the maximum deviation, the maximum inclination angle and the maximum inclination azimuth of the building structure changing with time, the risk judging module is configured to determine whether the maximum deviation, the maximum inclination angle and the maximum inclination azimuth of the building structure have abnormal changes, and the early warning module is configured to perform abnormal alarm and risk response when the risk judging module judges that the building structure has the abnormal changes.

* * * * *